May 9, 1950 — F. D. BUTLER — 2,506,576
VARIABLE AND REVERSIBLE ROTARY FLUID POWER COUPLING
Filed March 12, 1946 — 2 Sheets-Sheet 1
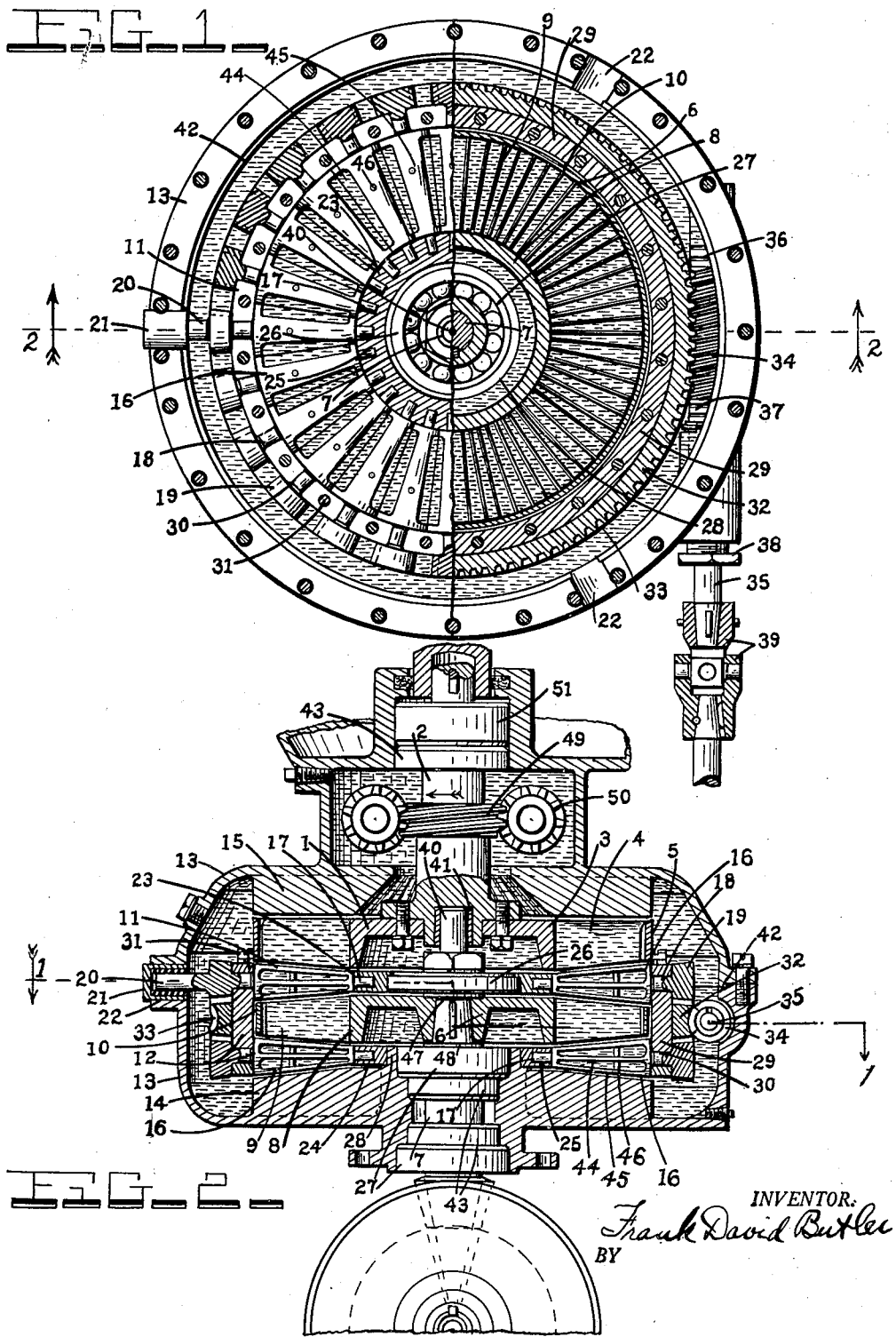
INVENTOR.
Frank David Butler

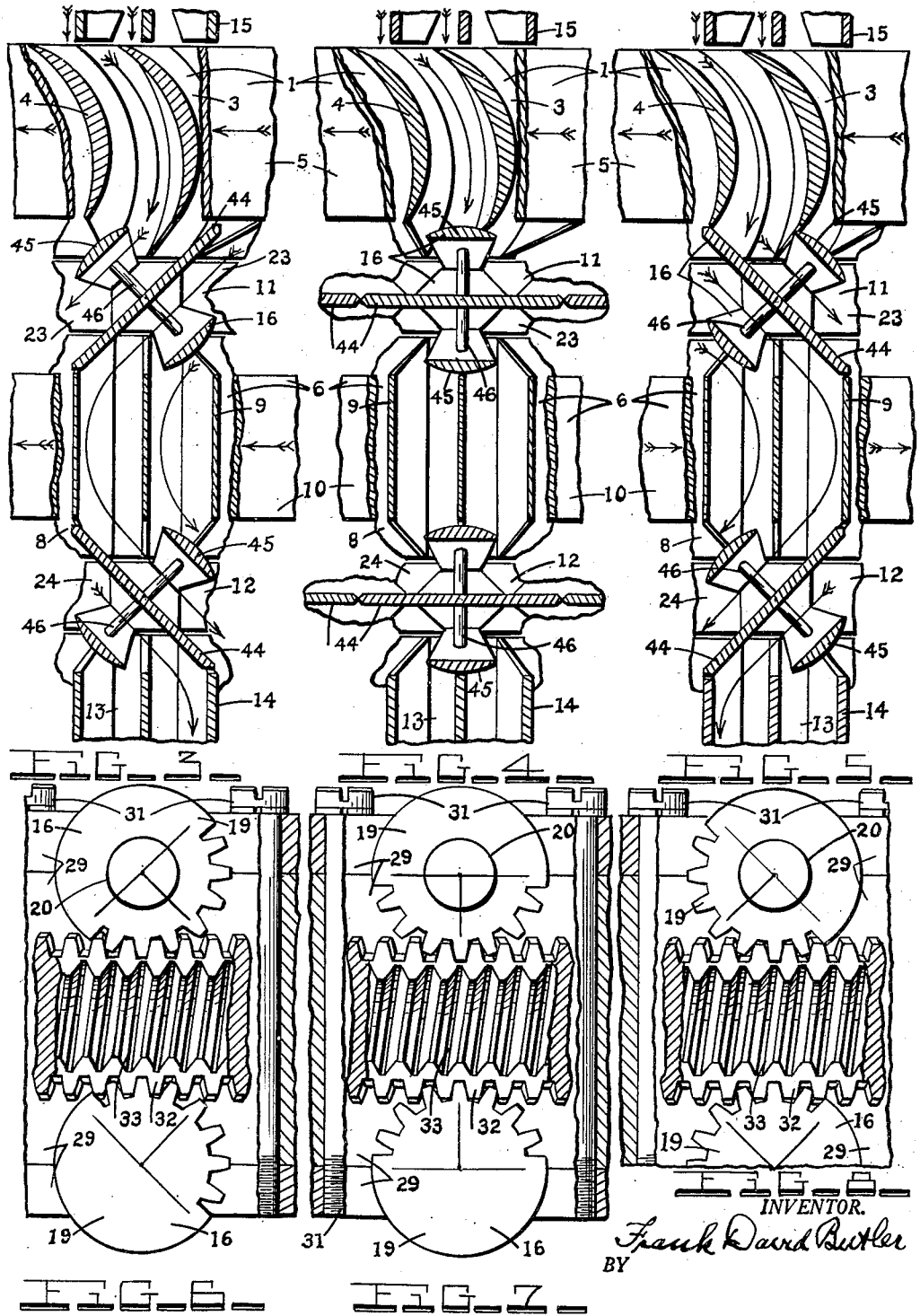

Patented May 9, 1950

2,506,576

UNITED STATES PATENT OFFICE 2,506,576

VARIABLE AND REVERSIBLE ROTARY FLUID POWER COUPLING

Frank David Butler, United States Navy

Application March 12, 1946, Serial No. 653,915

8 Claims. (Cl. 60—54)

(Granted under the act of March 3, 1883, as amended April 30, 1928; 370 O. G. 757)

My invention relates generally to fluid power coupling and specifically to a variable and reversible fluid coupling for use with power plants, automobiles or the like.

The principal object of my invention is to provide a fluid coupling having a means for reversing the direction of the driven or runner member.

Another object of my invention is to provide a fluid coupling having a neutral position of operation.

A further object of my invention is to provide a fluid coupling with a means of adjusting the speed of rotation of the driven member or runner from zero to maximum.

Other objects and advantages of my invention will be apparent by reference to the accompanying drawings which are intended as illustrative thereof and not limitations thereon, in which:

Figure 1 is an end-view in cross-section taken on two planes through the coupling, as indicated by the line 1—1 in Figure 2.

Figure 2 is a cross-sectional view of the coupling taken along the axis of the driver and runner shafts, on the line 2—2 in Figure 1, with portions of those shafts in side elevation.

Figures 3, 4 and 5 are end-views in section of the impeller, intermediate variable, runner and fixed guide vanes of the coupling.

Figures 6, 7 and 8 are end-views of the miter and ring gearing used to rotate the intermediate variable vanes.

Referring in more particular to Figures 1 and 2, Figure 1 is a view in cross-section taken on line 1—1 of Figure 2. In Figure 2, impeller member 1 is secured to drive shaft 2 which rotates in bearing 51 when driven by an external source of power not here shown. The hub 3 of the impeller 1 has radially extending curved and tapered blades 4, having an inclined edge, and attached thereon and enclosed by annular band 5 at their outer ends. The driven member or runner 6 is secured to driven shaft 7 rotatable in bearing 27 with suitable oil seals 43. Hub 8 of the runner 6 has blades 9, having inclined edges, and attached thereon and enclosed by annular band 10 at their outer ends.

The intermediate vane assembly 11 is positioned between impeller 1 and runner 6; and another vane assembly 12 is positioned between runner 6 and an annular ring of radially extending guide vanes 14 attached to or fabricated as a part of the housing 13. Another set of guide vanes 15 is positioned in the other end of the housing 13 and similarly constructed. The intermediate variable vanes 16, in each of assemblies 11 and 12, are journaled or pivoted at the inner ends with short shaft portions 17 in recesses 25 in each of two annular rings 23 and 24. Ring 23, supporting assembly 11, is a press fit or otherwise secured over the bearing 26 which is mounted on shaft 7, and ring 24 supporting assembly 12 is mounted on shell 28 in which the thrust and support bearing 27 is secured.

An annular ring member 29 is composed of three rings with split recesses 30 to hold the shaft portions 18 of the intermediate vanes 16 and is secured together by bolts 31. Each vane 16 has secured at its outer end a partially milled miter gear 19 in engagement with a double-faced master miter gear 32 on the outer periphery of which is milled a ring gear in mesh with worm gear 34 mounted on shaft 35. Shaft 35 is journaled in bearings 36 and 37 with a suitable stuffing box 38 in the side of the housing 13 permitting rotation of the shaft from remote means not here illustrated through flexible joint 39.

In Figures 6, 7 and 8 the ends of the miter gears 19 in engagement with the main master miter gear 32 are shown in positions of forward, neutral and reverse, respectively, with the unmilled portions of the miter gears 19 forming stops in the rotation of the gearing. This prohibits turning the intermediate vanes 16 beyond a prescribed degree of rotation.

A suitable number of the vanes 16 have short shafts 20 extending out beyond the gears 19 into recesses 20 having resilient material 21 and in this way the intermediate assemblies 11 and 12 are fixed in position and supported.

A bearing 40 on driven shaft 7 extends into bearing 41 in the end of the driving shaft 2 and serves to align the shafts. The housing 13 is constructed in a conventional manner of two halves secured by rabbet joint 42 and conventional bolt means.

Referring to Figures 3, 4 and 5, impeller 1 with annular ring 5 enclosing the ends of the tapered and curved blades 4 is shown as rotating in the direction of the horizontal arrows while the fluid flow is indicated by the arrows shown between the vanes 15. Intermediate vane 16 is constructed of two wing fins 45 and a central fin 44 fastened together with pin 46 and rotatable within limits to positions of forward, neutral and reverse as shown in Figures 3, 4 and 5 respectively. It will readily be seen that the inclined edges of the intermediate vanes 16 match the inclination of the adjacent edges of the blades 4 of the impeller and the blades 9 of the runner. The blades 9 of the runner are radially straight in order to be driven either forward or reverse. Wing fins 45 have rounded outer sides to permit a close fit with adjacent blades at positions approaching neutral. Shims 47 and 48 on the shaft 7 allow the assembly of the various parts with the clearances required. Worm gears 49 and spur gears 50 permit the operation of auxiliary equipment not here illustrated.

As is readily understood from the foregoing, the fluid contained in the housing 13 is circulated by the impeller blades 4 and is directed to either surface of the runner blades 9 by the intermediate vanes 16. Fixed vanes 14 direct the recirculation of the fluid in the conventional manner back to the fixed vanes 15 in the impeller half of the housing. Rotation of the shaft 39 by external means causes the vanes 16 to rotate to forward or reverse positions, and neutral position is obtained half way between, at which virtually no fluid is circulated due to the central fins 44 forming a substantially closed disc.

In the position of neutral, free-wheeling or over-running of the runner is possible, as no fluid is back-pumped to the impeller by the runner. Braking action is obtained in either direction by reversing the fluid flow to the opposite side of the runner, and in proportion to the power applied to the impeller. It will also be seen that in either forward or reverse positions or in substantially those positions, the power delivered to the runner will be the sum of the impulse forces from the impeller and the reaction forces as the fluid leaves the runner and enters the next intermediate vanes, and fixed vanes.

It is understood that various changes may be made within the scope of the appended claims without sacrificing any of the advantages of the invention.

The invention herein described may be manufactured and used by or for the Government of the United States of America for governmental purposes without the payment of any royalties thereon or therefor.

What is claimed is:

1. In a fluid power coupling, the combination of a fluid-filled housing, a driver shaft and a driven shaft aligned within said housing, an impeller secured on said driver shaft and a runner secured on said driven shaft both within said housing, an annular series of radially disposed axially fixed variable vanes positioned between said impeller and said runner, a plurality of radial fixed guide vanes positioned at each inner end of the housing, a second annular series of radially disposed variable vanes positioned between said runner and the said fixed guide vanes at one end of the housing, and means for simultaneously adjusting both of said series of variable vanes.

2. The combination as set forth in claim 1 in which the variable vanes are each adapted to turn about its axis to a substantially closed position whereby the fluid passage from the impeller to the runner is virtually closed.

3. In a fluid power coupling, the combination of a fluid-filled housing, a driver shaft and a driven shaft axially aligned in said housing, an impeller secured on said driver shaft, a runner secured on said driven shaft, one set of pivoted vanes having their axes arranged radially about an axially aligned fixed hub positioned between said impeller and said runner, a second set of pivoted vanes having their axes arranged radially about a second axially aligned fixed hub positioned between said runner and a plurality of fixed guide vanes secured to the inner end of said housing, a second set of fixed guide vanes on the other inner end of said housing adjacent said impeller, and means for adjusting both sets of pivoted vanes to change the angle of entrance and discharge of fluid passing through said runner.

4. In a fluid power coupling, the combination of an impeller and a runner each with blading and each fixed to axially aligned shafts within a fluid-filled housing, a plurality of variable vane units radially disposed between said impeller and said runner, said vane units being adjacent to each other, each of said vane units comprising a central fin and two wing fins, said central fin adapted in combination with the central fins of adjacent vane units to form an annular disc substantially blocking fluid flow at neutral position and adapted to form in combination with said wing fins of the same unit fluid deflectors in either of two positions of forward and reverse, said central fin further adapted to provide minimum clearances with said impeller and said runner at forward and reverse position, and said wing fins adapted to provide minimum clearances with the adjacent impeller and runner at positions of neutral, a second plurality of similarly constructed variable vane units radially disposed between said runner and fixed guide vanes secured at one inner end of said housing, other guide vanes at the other inner end of said housing, and means for rotating all said variable vane units to deflect fluid flow to either forward or reverse side of blading of said runner and in neutral position to block fluid flow to said runner.

5. The combination as set forth in claim 4 in which the means for varying said variable vane units comprising a miter gear secured at the outer end of each vane unit and engaged with a double-faced master miter gear positioned between the two annular rings of miter gears of the two sets of variable vane units, and an externally controlled worm gear engageable with a ring gear milled into the outer periphery of said master miter gear.

6. In a fluid power coupling, the combination of a housing, fluid contained in said housing, a driver shaft projecting into said housing, a driven shaft axially aligned with said driver shaft projecting into said housing, an impeller with radially curving blades mounted on said driver shaft within said housing, a runner with radially straight blades mounted on said driven shaft within said housing, radially straight guide vanes secured to each of the inner ends of said housing, an annular assembly of radially disposed variable vanes positioned between said impeller and said runner, a second annular assembly of radially disposed variable vanes positioned between said runner and said radially straight guide vanes at one end of said housing, a miter gear secured to the outer end of each variable vane, a master miter gear engageable with each of said miter gears, a ring gear attached to said master miter gear, a worm gear engageable with said ring gear and mounted on a rotatable shaft projecting into said housing, and means on each miter gear for limiting the rotation thereof in either direction.

7. The combination as set forth in claim 6 in which said means for limiting the rotation of said miter gears comprises unmilled sections of said miter gears abutting said master miter gear.

8. The combination as set forth in claim 6 in which the radially curving blades of the impeller have at least one inclined edge, the widest portion thereof being nearest the driver shaft, said radially straight blades on said runner having both edges inclined with the widest portion thereof nearest the driven shaft, said radially straight guide vanes at one end of said housing having edges adjacent said variable vanes inclined with the widest portion nearest said driven shaft, and said radially disposed variable vanes having edges inclined with the widest portion nearest their outer ends whereby said variable vanes form a substantially closed disc at one position of adjustment.

FRANK DAVID BUTLER.

REFERENCES CITED

The following references are of record in the file of this patent:

UNITED STATES PATENTS

| Number | Name | Date |
| --- | --- | --- |
| 2,162,543 | Banner | June 13, 1939 |
| 2,205,794 | Jandasek | June 25, 1940 |
| 2,292,384 | Lysholm | Aug. 11, 1942 |
| 2,327,647 | Jandasek | Aug. 24, 1943 |
| 2,389,174 | Whitworth | Nov. 20, 1945 |